US008606951B2

(12) United States Patent
Green (10) Patent No.: US 8,606,951 B2
(45) Date of Patent: Dec. 10, 2013

(54) MEDIA STREAM SCHEDULING FOR HICCUP-FREE FAST-CHANNEL-CHANGE IN THE PRESENCE OF NETWORK CHOKEPOINTS

(75) Inventor: Dustin L. Green, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 12/098,672

(22) Filed: Apr. 7, 2008

(65) Prior Publication Data

US 2008/0189755 A1 Aug. 7, 2008

Related U.S. Application Data

(62) Division of application No. 10/683,132, filed on Oct. 10, 2003, now Pat. No. 7,444,419.

(51) Int. Cl.
*G06F 15/16* (2006.01)

(52) U.S. Cl.
USPC .......................... 709/231; 709/233; 709/234

(58) Field of Classification Search
USPC ................................. 709/231, 232, 233, 234
See application file for complete search history.

(56) References Cited

U.S. PATENT DOCUMENTS

| | | | |
|---|---|---|---|
| 5,461,415 A | 10/1995 | Wolf et al. | |
| 5,473,362 A | 12/1995 | Fitzgerald et al. | |
| 5,583,868 A | 12/1996 | Rashid et al. | |
| 5,631,694 A | 5/1997 | Aggarwal et al. | |
| 5,699,362 A | 12/1997 | Makam | |
| 5,724,646 A | 3/1998 | Ganek et al. | |
| 5,732,217 A | 3/1998 | Emura | |
| 5,822,537 A | 10/1998 | Katseff et al. | |
| 5,884,141 A | 3/1999 | Inoue et al. | |
| 5,892,915 A | 4/1999 | Duso et al. | |
| 5,926,230 A | 7/1999 | Niijima et al. | |
| 5,936,659 A | 8/1999 | Viswanathan et al. | |
| 5,963,202 A | 10/1999 | Polish | |
| 6,028,843 A | 2/2000 | Delp et al. | |
| 6,047,317 A | 4/2000 | Bisdikian et al. | |

(Continued)

FOREIGN PATENT DOCUMENTS

| | | |
|---|---|---|
| CA | 2480461 | 10/2003 |
| EP | 0633694 | 1/1995 |

(Continued)

OTHER PUBLICATIONS

U.S. Appl. No. 10/218,674; Barrett et al., Filed Aug. 13, 2002.

(Continued)

*Primary Examiner* — Douglas Blair (57) ABSTRACT

An implementation, as described herein, facilitates fast start-up of a new media stream while avoiding temporal interruption (i.e. "hiccups") of the presentation of that new media stream. At least one implementation, described herein, coordinates the delivery of multiple simultaneous media streams on a media-stream network. Its coordination accounts for traversal of bandwidth-restricted chokepoints; quickly stopping delivery of one or more media streams from the set of streams; quickly initiating delivery and presentation of one or more new media streams not previously in the set (i.e., a "channel change") and producing clean playback of all of the streams in the set, despite their different timelines. This abstract itself is not intended to limit the scope of this patent. The scope of the present invention is pointed out in the appending claims.

8 Claims, 3 Drawing Sheets

(56) References Cited

U.S. PATENT DOCUMENTS

| | | |
|---|---|---|
| 6,078,594 A | 6/2000 | Anderson et al. |
| 6,118,498 A | 9/2000 | Reitmeier |
| 6,138,147 A | 10/2000 | Weaver et al. |
| 6,222,482 B1 | 4/2001 | Gueziec |
| 6,222,886 B1 | 4/2001 | Yogeshwar |
| 6,233,226 B1* | 5/2001 | Gringeri et al. ............... 370/252 |
| 6,266,817 B1 | 7/2001 | Chaddha |
| 6,272,566 B1* | 8/2001 | Craft .............................. 710/53 |
| 6,330,286 B1 | 12/2001 | Lyons et al. |
| 6,418,473 B1 | 7/2002 | St. Maurice et al. |
| 6,430,547 B1 | 8/2002 | Busche et al. |
| 6,496,814 B1 | 12/2002 | Busche |
| 6,505,106 B1 | 1/2003 | Lawrence et al. |
| 6,564,262 B1 | 5/2003 | Chaddha |
| 6,580,754 B1 | 6/2003 | Wan et al. |
| 6,609,149 B1 | 8/2003 | Bandera et al. |
| 6,611,872 B1* | 8/2003 | McCanne ..................... 709/238 |
| 6,615,133 B2 | 9/2003 | Moskowitz et al. |
| 6,637,031 B1 | 10/2003 | Chou |
| 6,721,952 B1 | 4/2004 | Guedalia et al. |
| 6,728,253 B1* | 4/2004 | Jeffries et al. ................. 370/412 |
| 6,728,270 B1 | 4/2004 | Meggers et al. |
| 6,728,965 B1 | 4/2004 | Mao |
| 6,738,980 B2 | 5/2004 | Lin et al. |
| 6,751,129 B1 | 6/2004 | Gongwer |
| 6,751,626 B2 | 6/2004 | Brown et al. |
| 6,766,245 B2 | 7/2004 | Padmanabhan |
| 6,782,193 B1* | 8/2004 | Nakatani et al. ............. 386/126 |
| 6,837,031 B1 | 1/2005 | Hannen et al. |
| 6,842,724 B1 | 1/2005 | Lou et al. |
| 6,856,759 B1 | 2/2005 | Fukuda et al. |
| 6,985,188 B1* | 1/2006 | Hurst, Jr. ...................... 348/553 |
| 7,051,170 B2 | 5/2006 | Guo |
| 7,064,749 B1 | 6/2006 | Enmei |
| 7,072,299 B2* | 7/2006 | Bass et al. ..................... 370/235 |
| 7,095,945 B1* | 8/2006 | Kovacevic .................... 386/201 |
| 7,106,749 B1 | 9/2006 | Darshan et al. |
| 7,158,531 B2 | 1/2007 | Barton |
| 7,167,488 B2 | 1/2007 | Taylor et al. |
| 7,334,044 B1 | 2/2008 | Allen |
| 7,382,796 B2 | 6/2008 | Haberman et al. |
| 7,444,419 B2* | 10/2008 | Green .......................... 709/231 |
| 7,457,243 B2 | 11/2008 | Meggers et al. |
| 7,542,663 B2* | 6/2009 | Nakatani et al. ............. 386/126 |
| 7,606,928 B2 | 10/2009 | Wang et al. |
| 2002/0002708 A1 | 1/2002 | Arye |
| 2002/0024956 A1 | 2/2002 | Keller-Tuberg |
| 2002/0031144 A1 | 3/2002 | Barton |
| 2002/0040481 A1 | 4/2002 | Okada et al. |
| 2002/0087973 A1* | 7/2002 | Hamilton et al. ............... 725/32 |
| 2002/0107968 A1 | 8/2002 | Horn et al. |
| 2002/0108119 A1 | 8/2002 | Mao et al. |
| 2002/0114331 A1 | 8/2002 | Cheung et al. |
| 2002/0124258 A1 | 9/2002 | Fritsch |
| 2002/0144276 A1 | 10/2002 | Radford et al. |
| 2002/0147979 A1 | 10/2002 | Corson |
| 2002/0147991 A1 | 10/2002 | Furlan et al. |
| 2002/0170067 A1 | 11/2002 | Norstrom et al. |
| 2003/0037331 A1 | 2/2003 | Lee |
| 2003/0060196 A1 | 3/2003 | Levinberg |
| 2003/0093801 A1 | 5/2003 | Lin et al. |
| 2003/0106053 A1 | 6/2003 | Sih et al. |
| 2003/0158899 A1 | 8/2003 | Hughes |
| 2003/0159143 A1 | 8/2003 | Chan |
| 2003/0202594 A1 | 10/2003 | Lainema |
| 2003/0202775 A1 | 10/2003 | Junkersfeld et al. |
| 2004/0003399 A1 | 1/2004 | Cooper |
| 2004/0034863 A1 | 2/2004 | Barrett et al. |
| 2004/0034864 A1 | 2/2004 | Barrett et al. |
| 2004/0049793 A1 | 3/2004 | Chou |
| 2004/0128694 A1 | 7/2004 | Bantz et al. |
| 2004/0160971 A1 | 8/2004 | Krause et al. |
| 2004/0160974 A1 | 8/2004 | Read et al. |
| 2004/0174883 A1 | 9/2004 | Johansson et al. |
| 2004/0255328 A1 | 12/2004 | Baldwin et al. |
| 2005/0039214 A1 | 2/2005 | Lorenz et al. |
| 2005/0071496 A1 | 3/2005 | Singal et al. |
| 2005/0078680 A1 | 4/2005 | Barrett et al. |
| 2005/0078757 A1 | 4/2005 | Nohrden |
| 2005/0080904 A1 | 4/2005 | Green |
| 2005/0081243 A1 | 4/2005 | Barrett et al. |
| 2005/0081244 A1 | 4/2005 | Barrett et al. |
| 2005/0081246 A1 | 4/2005 | Barrett et al. |
| 2005/0128951 A1 | 6/2005 | Chawla et al. |
| 2005/0154917 A1 | 7/2005 | deCarmo |
| 2005/0172314 A1 | 8/2005 | Krakora et al. |
| 2005/0190781 A1 | 9/2005 | Green et al. |
| 2005/0240961 A1 | 10/2005 | Jerding et al. |
| 2006/0117343 A1 | 6/2006 | Novak et al. |
| 2006/0117358 A1 | 6/2006 | Baldwin et al. |
| 2006/0117359 A1 | 6/2006 | Baldwin et al. |
| 2006/0123443 A1* | 6/2006 | Hamilton et al. ............... 725/32 |
| 2006/0126667 A1 | 6/2006 | Smith et al. |
| 2006/0251082 A1 | 11/2006 | Grossman, IV et al. |
| 2007/0113261 A1 | 5/2007 | Roman et al. |
| 2010/0138489 A1 | 6/2010 | Corley et al. |

FOREIGN PATENT DOCUMENTS

| | | |
|---|---|---|
| EP | 1294193 | 9/2002 |
| TW | 388182 B | 4/2000 |
| WO | WO9806045 | 2/1998 |
| WO | WO9909741 | 2/1999 |
| WO | WO0009741 | 2/2000 |
| WO | WO0103373 | 1/2001 |
| WO | WO0126271 | 4/2001 |
| WO | 0157667 | 8/2001 |
| WO | WO0156285 | 8/2001 |
| WO | WO02087235 | 10/2002 |
| WO | WO03088646 | 10/2003 |
| WO | WO2004062291 | 7/2004 |

OTHER PUBLICATIONS

U.S. Appl. No. 10/218,675; Barrett et al., Filed Aug. 13, 2002.
U.S. Appl. No. 10/460,949; Baldwin, et al.; Filed Jun. 13, 2003.
U.S. Appl. No. 10/683,132; Green; Filed Oct. 10, 2003.
U.S. Appl. No. 10/684,138; Barrett, et al., Filed Oct. 10, 2003.
U.S. Appl. No. 10/789,128; Green, et al.; Feb. 27, 2004.
U.S. Appl. No. 10/798,993; Barrett et al.; Filed Mar. 12, 2004.
U.S. Appl. No. 10/800,287; Barrett et al., Filed Mar. 12, 2004.
U.S. Appl. No. 10/800,309; Barrett et al., Filed Mar. 12, 2004.
U.S. Appl. No. 11/010,200, Smith et al., Filed Oct. 10, 2004.
Armitage, "Support for Multicast over UNI 3.0/3.1 based ATM Networks", RFC 2022, Standards Track, Nov. 1996, pp. 1-82.
BenAbdelkader, et al., "Combining Holistic and Parametric Approaches for Gait Recognition," Submitted to IEEE Transactions on Pattern Analysis and Machine Intelligence, Dec. 2002, 37 pages.
BenAbdelkader, et al., "EigenGait: Motion-based Recognition of People Using Image Self-similarity," Proc, Intl. on Audio and Video-based Person Authentication (AVBPA), 2001, 11 pages.
BenAbdelkader, et al., "Motion-based Recognition of People in Eigengait Space," 5th International Conference on Automatic Face and Gesture Recognition, May 20, 2002, pp. 1-6.
BenAbdelkader, et al., "Person Identification Using Automatic Height and Stride Estimation," IEEE International Conference on Pattern Recognition, Aug. 11, 2002-Aug. 15, 2002, pp, 1-4.
BenAbdelkader, et al., "Stride and Cadence as a Biometric in Automatic Person Identification and Verification," 5th International Conference on Automatic Face and Gesture Recognition, May 20, 2002, pp. 1-6.
BenAbdelkader, et al., "View-invariant Estimation of Height and Stride for Gait Recognition," Workshop on Biometric Authentication (BIOMET), in association with ECCV 2002, Jun. 1, 2002, 12 pages.
Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.
"Digital Headend Solutions; Tune in to Digital TV", retrieved from the Internet on Nov. 3, 2005, Available at [[http://www.utsystems.com/digitalheadend/solutions/index.cfm]], 1 page.

(56) References Cited

OTHER PUBLICATIONS

Ding, et al., "Resource-Based Striping: An Efficient Striping Strategy for Video Servers Using Heterogeneous Disk-Subsystems", Multimedia Tools and Applications, vol, 19, No. 1, Jan, 2003, pp. 29-51.
Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.
Gil, et al., "Simulation of a Mobility Prediction Scheme Based on Neuro-Fuzzy Theory in Mobile Computing", Simulation, Jul. 2000, vol. 75, No. 1, pp. 6-17.
Gonzalez, et al., "Load Sharing Based on Popularity in Distributed Video on Demand Systems", Proceedings 2002 IEEE Int'l Conf. on Multimedia and Expo, vol. 1, Aug. 2002, pp. 5-8.
Halvorsen et al., "Q-L/MRP: A Buffer Management Mechanism for QoS Support in a Multimedia DBMS", IEEE 1998, pp. 162-171.
Haritaoglu, et al., "W4S: A Real-Time System for Detecting and Tracking People in 2 1/2 D," in European Conference on Computer Vision, 1998, 16 pages.
Hurst, et al., "MPEG Splicing: A New Standard for Television-SMPTE 312M", SMPTE Journal, Nov. 1998, pp. 978-988.
"Infovalue Experts; Info Value Unveils Industry's First Video Multicasting Solution with Instant Replay", retrieved from the Internet on Nov. 3, 2005, Available at [[http://www.infovalue.com/links/news%20room/press%20releases/1999/Press_%20First_Multicasting_with_Instant_Replay.pdf]], 3 pages.
Kamiyama et al., "Renegotiated CBR Transmission in Interactive Video-on-Demand System", IEE 1997, pp. 12-19.
Lee, "Staggered Push-A Linearly Scalable Architecture for Push-Based Parallel Video Servers", IEEE Transactions on Multimedia, vol. 4, No. 4, Dec. 2002, pp. 423-434.
Lo, et al., "Deploy Multimedia-on-Demand Services over ADSL Networks", PCM 2002; Lecture Notes in Computer Science, vol. 2532, Dec. 2002, pp. 295-302.
Lu et al., "Experience in designing a TCP/IP based VOD system over a dedicated network", IEE 1997, pp. 262-266.
McKinley, et al., "Group Communication in Multichanel Networks with Staircase Interconnection Topologies", Computer Communication Review, ACM, Sep. 1989, vol. 19, No. 4, pp. 170-181.
MediaFLO; Introducing FLO Technology:, retrieved from the Internet on Nov. 3, 2005, available at [[http://www.qualcomm.com/mediaflo/news/pdf/flo_whitepaperpda]], pp. 1-8.
"Multidimensional Database Technology", Computer, Dec. 2001, vol. 34, No, 12, pp. 40-46.
Murphy, "Overview of MPEG", retrieved on Mar. 29, 2007, at <<http://web.archive.org/web/20001203031200/http://www.eeng,dcu.ie/~murphyj/the/the/no...>>, pp. 1-3.
"Optibase MGW 2400", retreived from the Internet Nov. 3, 2005, Available at [[http://www.epecomgraphics.com/optibase_mgw2400_features.html]], 2 pages.
Petit et al "Bandwidth Resource Optimization in Video-On-Demand Network Architectures", IEE 1994, pp. 91-97.
"QuickTime Streaming your Media in Real Time", retrieved from the Internet on Nov. 3, 2005, Accessible at [[http://www.apple.com.tw/quicktime/technologies/streaming/]], 3 pages.
Song, et al., "Replica Striping for Multi-Resolution Video Servers", IDMS/PROMS 2002; Lecture Notes in Computer Science, vol. 2515, No. 2002, pp. 300-312.
State, et al., "Active Network Based Management for QoS Assured Multicast Delivered Media", Joint 4th IEEE Int'l Conf. on ATM and High Speed Intelligent Internet Symposium, Apr. 2001, pp. 123-127.
Tsai, R., "An Efficient and Accurate Camera Calibration Technique for 3d Machine Vision," Proceedings of the Computer Vision and Pattern Recognition, 1986, pp. 364-374.
Turk, et al., "Face Recognition Using Eigenfaces," CVPR, 1991. pp. 586-591.
Wee, et al., "Splicing MPEG Video Streams in the Compressed Domain", IEEE 1997, pp. 224-230.
Wolfson, et al., "Modeling Moving Objects for Location Based Services", Lectures Notes in Computer Science, 2002, vol. 2538, pp. 46-58.
Wu, et al., "Scalable Video Coding and Transport over Broad-Band Wireless Networks", Proceedings of the IEEE, Jan. 2001, vol. 89, No. 1, pp. 6-20.
Zhang, et al., "Data Modeling of Moving Objects with GPS/GIS in Web Environment", International Conference on Communications, Circuits and Systems and West Sino Exposition Proceedings, 2002, vol. 2 pp. 1581-1585.
Zhang, et al., "The Cost Model of Moving Objects Communication with GPS", International Conference on Communications, Circuits and Systems and West Sino Exposition Proceedings, 2002, vol. 2, pp. 1576-1580.
Zhou, et al., "On-line Scene Change Detection of Multicast (MBone) Video", Proceedings of the SPIE-The International Society for Optical Engineering, Nov. 1998, vol. 3527, pp. 271-282.
U.S. Appl. No. 10/218,674; Barrett, et al.; Filed Aug. 13, 2002.
Non Final Office Action for U.S. Appl. No. 10/218,674, Dated Jan. 9, 2007.
Non Final Office Action for U.S. Appl. No. 10/218,674, Dated Oct. 10, 2007.
Final Office Action for U.S. Appl. No. 10/218,674, Dated Apr. 14, 2008.
U.S. Appl. No. 10/798,993, Barrett, et al., Filed Mar. 12, 2004.
Non-Final Office Action Received for U.S. Appl. No. 10/798,993, Dated Jul. 8, 2008.
U.S. Appl. No. 10/800,287, Barrett, et al., Filed Mar. 12, 2004.
Non Final Office Action Received for U.S. Appl. No. 10/800,287, Dated Oct. 3, 2007.
Final Office Action Received for U.S. Appl. No. 10/800,287, Dated Mar. 18, 2008.
U.S. Appl. No. 10/800,309, Barrett, et al., Filed Mar. 12, 2004.
Non Final Office Action Received for U.S. Appl. No. 10/800,309, Dated Oct. 5, 2007.
Non Final Office Action Received for U.S. Appl. No. 10/800,309, Dated Apr. 4, 2008.
U.S. Appl. No. 10/218,675; Barrett, et al.; Filed Aug. 13, 2002.
Non Final Office Action for U.S. Appl. No. 10/218,675 Dated May 8, 2007.
Non Final Office Action for U.S. Appl. No. 10/218,675 Dated Jan. 24, 2008.
Final Office Action for U.S. Appl. No. 10/218,675 Dated Sep. 4, 2008.
U.S. Appl. No. 11/010,200, Smith, et al.; Filed Dec. 10, 2004.
Non Final Office Action for U.S. Appl. No. 11/010,200, Dated Apr. 8, 2008.
Examination Report received for European Patent Application No. 04023424.7, mailed Feb. 28, 2013, 3 pages.

* cited by examiner

MEDIA STREAM SCHEDULING FOR HICCUP-FREE FAST-CHANNEL-CHANGE IN THE PRESENCE OF NETWORK CHOKEPOINTS

This application claims priority to, and is a divisional application of, U.S. Application Ser. No. 10/683,132, filed Oct. 10, 2003 now U.S. Pat. No. 7,444,419, which is incorporated by reference herein in its entirety.

TECHNICAL FIELD

This invention generally relates to a data signal transmission technology.

BACKGROUND

With the advent of digital media streaming technology (such as those using unicast, multicast, and broadcast), users are able to see and hear digital media, more or less, as the data is being received from a media server.

Herein, a "media stream" is a multimedia object (containing audio and/or visual content, such as a video) that is compressed and encoded in accordance with mechanisms generally available now or in the future for doing so. Furthermore, such a media stream is intended to be decoded and rendered in accordance with generally available mechanisms for doing so.

Without a loss of generality, the same techniques can be applied to any media stream that has a similar structure, which reduces temporal or spatial redundancies. For example, many audio compression formats such as AC3 have keyframes followed by modification data to regenerate an approximation of the original uncompressed stream.

Multimedia Distribution Format Standards

Due to the amount of data required to accurately represent such multimedia content, it is typically delivered to the computing device in an encoded, compressed form. To reproduce the original content for presentation, the multimedia content is typically decompressed and decoded before it is presented.

A number of multimedia standards have been developed that define the format and meaning of encoded multimedia content for purposes of distribution. Organizations such as the Moving Picture Experts Group (MPEG) under the auspices of the International Standards Organization (ISO) and International Electrotechnical Commission (IEC), and the Video Coding Experts Group (VCEG), under the auspices of the International Telecommunications Union (ITU), have developed a number of multimedia coding standards (e.g., MPEG-1, MPEG-2, MPEG-4, H.261, H.263, and the like).

There are many different standardized video-stream data formats. For example: MPEG, H.263, MPEG-1, MPEG-2, MPEG-4 Visual, H.264/AVC, and DV formats. Likewise, there are many different standardized audio-stream data formats. For example: MPEG audio, AC3 audio, DTS audio, or MLP audio.

MPEG-2/H.262

The predominant digital video compression and transmission formats are from a family called block-based motion-compensated hybrid video coders, as typified by the ISO/IEC MPEG-x (Moving Picture Experts Group) and ITU-T VCEG H.26x (Video Coding Experts Group) standards. This family of standards is used for coding audio-visual information (e.g., movies, video, music, and such) in a digital compressed format.

For the convenience of explanation, the MPEG-2 media stream (also known as an H.262 media stream) is generally discussed and described herein, as it has a structure that is typical of conventional video coding approaches. However, those who are skilled in the art understand and appreciate that other such digital media compression and transmission formats exist and may be used.

A typical MPEG-2 video sequence is composed of a sequence of frames that is typically called Groups of Pictures (or "GOP"). A GOP is composed of a sequence of pictures or frames. The GOP data is compressed as a sequence of I-, P- and B-frames.

I-frame (i.e., intra-frame) is an independent starting image—(compressed in a similar format to a JPEG image). An I-frame or "key frame" is encoded as a single image, with no reference to any past or future frames. It is sometimes called a random access point (RAP).

Those of ordinary skill in the art are familiar with the relationships between the I-, P- and B-frames.

Transmission of Media Streams

For practical purposes, the continuous media streams carrying audio or video from a media-stream encoder are typically broken into multiple packets for transmission. These packetized streams are typically called packetized elementary streams (PES). These packets are identified by headers that contain time stamps for synchronizing PES packets.

A transport stream typically carries many different media streams. A media-stream decoder must be able to change from one media stream to the next and correctly select the appropriate audio and data channels of the newly selected media stream. Since each of the media streams may be viewed as a "channel," the act of changing from one media stream to another may be generically called "changing channels." Also, the act of starting a media stream, where none has been received before, may be called "changing channels" as well.

Time Stamp

After compression, the media-stream encoder typically sends frames out of sequence because of bidirectional encoding. The frames require a variable amount of data and are subject to variable delay due to multiplexing and transmission. For many reasons (including, for example, synchronizing the audio and video streams), time stamps are periodically incorporated into the media stream.

Time stamps indicate where a particular GOP belongs in time. When a decoder receives a PES packet, it decodes and buffers each frame. When the timeline count reaches the value of the time stamp, the frames in the buffer are read out.

PTS/DTS

When bidirectional coding is used, a frame may have to be decoded some time before it is presented, so that it can act as the source of data for another frame. Although, for example, pictures can be presented in the order IBBP, they will be transmitted in the order IPBB. Consequently, two types of time stamp exist. The decode time stamp (DTS) indicates the time when a picture must be decoded, whereas a presentation time stamp (PTS) indicates when it must be presented to the decoder output.

The PTS only indicates the presentation time of the first discretely presented portion of the frame, not the presentation time of subsequently presented portions (e.g., subsequent fields of a video frame, or subsequent samples of an audio frame).

Since the focus herein is on presentation of a stream as soon as possible, the discussion will ignore the DTS and instead refer to the PTS.

PCR

In a transport stream, the each channel may have originated at a different geographic location; and, therefore, is not likely to be synchronized. As a result, the transport stream typically provides a separate means of synchronizing for each channel. This synchronization uses a Program Clock Reference (PCR) time stamp, and it recreates a stable reference clock.

Some media-stream encoders provide an explicit PCR for each frame. Others provide them for some frames; thereby, leaving the PCR for the other frames to be determined implicitly. Herein, it is assumed that every packet has an explicit PCR or a PCR that may be determined implicitly.

Typically, media-stream encoders generate streams that obey certain bit-rate and timing restrictions. This is the obligation of the encoder.

Some encoders produce streams that are true CBR (constant bit-rate) streams. For true CBR streams, the PCR can be inferred to be equal to or a small negative offset from the DTS.

Some encoders generate VBR (variable bit rate) streams which still obey a specifiable max bit-rate restriction. For VBR streams, the encoder may give an explicit PCR on each packet, it may give an explicit PCR but only for some packets, or it may give no explicit PCR on any packet.

Underflow

When a receiving unit runs out of data to decode (or present), it is called "underflow." Underflow occurs when the receiving unit is ready to decode (or present) the next frame, but the has not yet received (or decoded) all of the data of that frame.

The practical and noticeable manifestation of an underflow is a temporal interruption (i.e., "hiccup" or "stutter") in the presentation motion video rather than the desired effect, which is a smoothly playing motion video. For example, instead of showing a motion video at a fixed frequency (e.g., 15 frames per second), a receiving unit experiencing underflow would show a frame of the video stream followed by a noticeable delay before the next or a later frame would display. This may continue for several seconds or minutes.

The conditions for an underflow are particularly ripe when a receiving unit changes channels. If the receiving unit immediately presents frames as soon as it receives frames and decodes incoming media stream of the new channel, an underflow condition is likely to arise.

Instead, it is common for the multimedia content to be presented to the user at some defined point (e.g., when the buffer is full enough or after a defined delay from reception). As the multimedia content plays, the receiving device empties the data stored in its buffer. However, while the receiving device is playing the stored multimedia, more data is downloaded to re-fill the buffer. As long as the data is downloaded at least as fast as it is being played back in such a way that the buffer is never completely empty, the file will play smoothly.

Typically, media-stream encoders generate streams that obey certain bit-rate and timing restrictions. Each transport packet produced by the encoder has an explicit or implicit PCR (program clock reference). The encoder guarantees that if the transport packets are sent at the times indicated by each packet's PCR, the stream as a whole will obey the bit-rate, timing, and causality restrictions of the stream.

For example, if the bit-rate restriction is that a media stream will be no more than one mega-bits per second (i.e., 1 Mb/s) when measured over a five second window, and the timing restriction is that the PCR to PTS delay will never be more than three seconds, and the causality restriction is that the PCR is less than or equal to DTS and the PCR is less than or equal to PTS, then the encoder must produce transport packets and PCRs and PTSs and DTSs (each either explicit or implicit) for the stream that, when taken together and sent according to each packet's PCR, obey all these restrictions, These conventional techniques, described above, that are designed to prevent underflow, produce an annoying side effect: "channel start-up delay."

SUMMARY

An implementation as described herein facilitates fast start-up of a new media stream while avoiding temporal interruption (i.e., "hiccups") of the presentation of that new media stream. At least one implementation, described herein, coordinates the delivery of multiple simultaneous media streams on a media-stream network. Its coordination accounts for traversal of bandwidth-restricted chokepoints; quickly stopping delivery of one or more media streams from the set of streams; quickly initiating delivery and presentation of one or more new media streams not previously in the set (i.e., a "channel change"): and producing clean playback of all of the streams in the set despite their different timelines.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention and, thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Media Stream Scheduling for Hiccup-Free Fast-Channel-Change in the Presence of Network Chokepoints that incorporate elements recited in the appended claims. These implementations are described with specificity in order to meet statutory written description, enabling, and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

An example of an embodiment of a Media Stream Scheduling for Hiccup-Free Fast-Channel-Change in the Presence of Network Chokepoints may be referred to as either an "exemplary media-stream scheduler."

While much of the discussion of the exemplary media-stream scheduler is framed within terms of the MPEG family of digital media compression and transmission formats, those of ordinary skill in the art will understand how the concepts discussed herein with relationship to MPEG apply to other formats, such as H.264.

Herein, "presenting" includes communicating the media content to a display and/or audio device. It may also include storing media content into a memory, transferring such content to another device or component, and/or transmitting the content via signal transmission media.

Introduction

With the exemplary media-stream scheduler, the "channel start-up delay" time is greatly reduced. With conventional approaches, the time between initiation of channel change and the presentation of full and smooth motion video is on the order of a magnitude of one or more seconds. With the exemplary media-stream scheduler, the time for the same action is on the order of a magnitude of a fractions of a second (e.g., 100 milliseconds).

In the conventional approach, the need to avoid "underflow" (which is manifested by stuttered or hiccupping video play) is a leading contributing factor for the lengthy channel start-up delay. The media-stream encoders typically provide guidance to the media presentation device (which is receiving the stream) that helps define the channel start-up delay.

To provide guidance, the encoder sends transmission schedule information with one or more packets in the stream time-stamped (with a PCR) to specify when the presentation device is safe to start playing the stream (without underflow). When doing this, the encoder often assumes a specific data-rate for the presentation device (such as 1 Mbs) and presumed timing restrictions.

However, the exemplary media-stream scheduler introduces a new approach that employs actual knowledge of the available bandwidth between a media-stream scheduler and a presentation device. The exemplary media-stream scheduler has actual knowledge of bandwidth availability of the network and actual knowledge of incoming media streams rather than assumptions or imposed restrictions.

Media-Stream Network Topology

Figure 1:
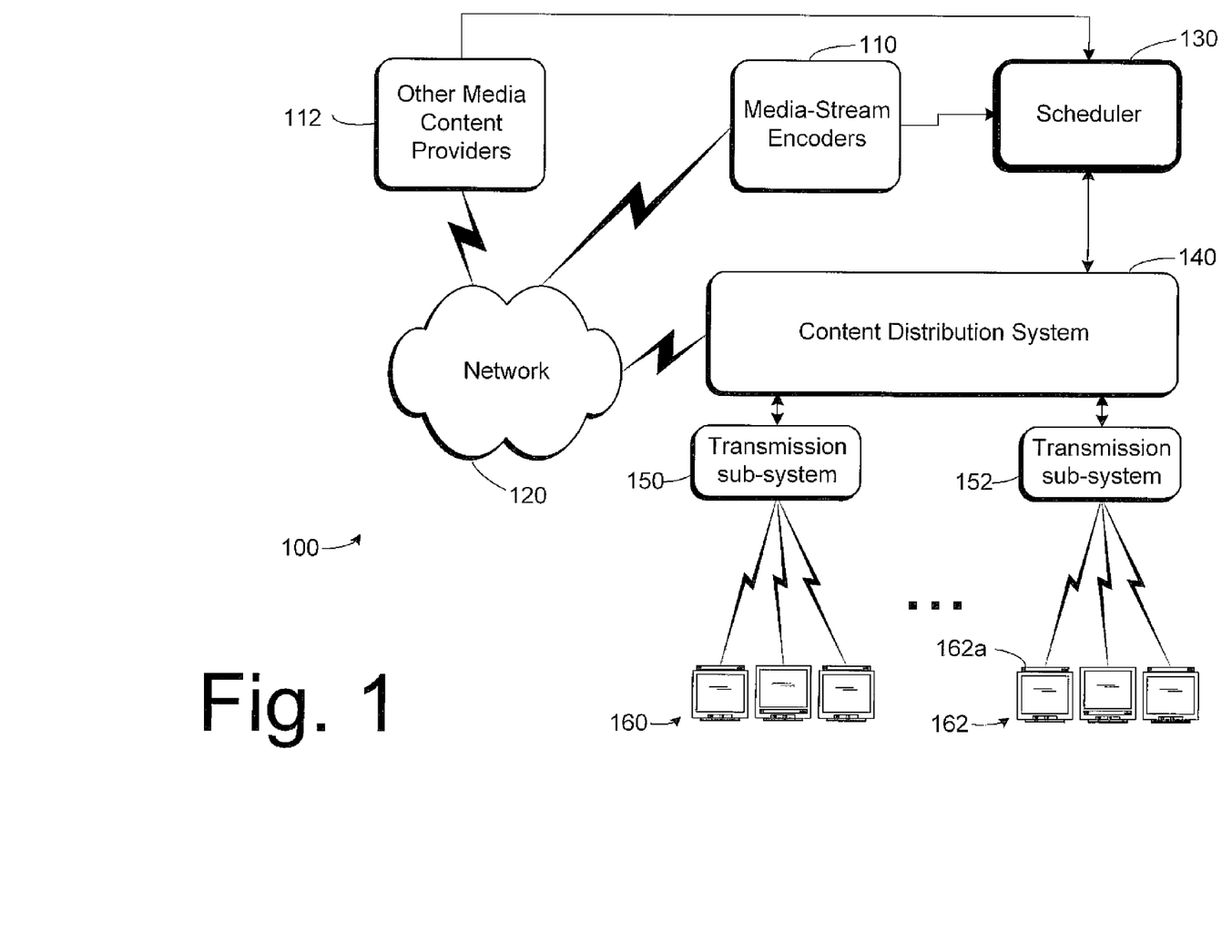
FIG. 1 is a schematic diagram illustrating an exemplary media-stream network topology capable of (wholly or partially) implementing at least one embodiment described herein.

FIG. 1 illustrates an exemplary media-stream network topology 100 in which the techniques, systems, and other aspects described herein may be implemented (partially or wholly). Exemplary topology 100 is a television entertainment system that facilitates distribution of multimedia.

The exemplary topology 100 includes one or more media-stream encoders 110, other content providers 112 (e.g., video-on-demand), a network 120 (having zero or more chokepoints therein), scheduler 130, and a content distribution system 140.

The media-stream encoders 110 and other content providers 112 provide media content, such as movies, television programs, commercials, music, and similar audio and/or video content. They provide this content in the form of media streams over the network 120 to the content distribution system 140 and ultimately to presentation devices (e.g., 160 and 162).

The content distribution system 140 is representative of a headend service that provides multimedia content to multiple subscribers. Coupled to the content distribution system 140 are one or more transmission sub-systems, such as those illustrated at 150 and 152. Only two are illustrated here, but, of course, there may be more transmission sub-systems.

Coupled to each sub-system are one or more media presentation devices, such as the groupings illustrated at 160 and 162. Each sub-system is shown with a groupings of three presentation devices, but, of course, there may be any number of presentations devices per sub-system.

The encoders 110 and content providers 112 transmit media streams to the presentation devices through the content distribution system 140 and the network 120.

The presentation devices (such as those illustrated in groupings at 160 and 162) may be implemented in a number of ways. A presentation device may be a "set-top" box. A presentation device may be coupled to a television for presenting the content received by the presentation device (e.g., audio data and video data), as well as a graphical user interface. A particular presentation device may be implemented to display or otherwise render content.

Network Topology and Unicast

The exemplary topology 100 may be a mix of broadcast, multicast-, and/or unicast-capable. However, the reception end of the exemplary topology 100—between the chokepoints and presentation devices—will be unicast.

While there may be an arbitrary set of chokepoints in a chokepoint topology, the media streams being tracked only go through each chokepoint a maximum of once on their way to the presentation device.

The content distribution system 140 is an example of a typical bandwidth-restricted chokepoint. Furthermore, the network 120 has zero or more bandwidth-restricted chokepoints. The exemplary media-stream scheduler allows for arbitrary chokepoint topology where the communication through the one or more chokepoints and to the presentation device(s) is unicast. In other words, it may account for one or more unicast chokepoints in a media-stream network topology.

The exemplary topology 100 (including the network 120) may include a cable television network, RF, microwave, satellite, and/or data network, such as the Internet, and may also include wired or wireless communications media using any multicast format or multicast protocol. Additionally, The exemplary topology 100 may use any type of network topology and any network communication protocol, and may be represented or otherwise implemented as a combination of two or more networks.

Each presentation device is associated with zero or more bandwidth-restricted chokepoints in the network topology. Conceptually, the data delivered to a presentation device passes through the chokepoints with which it is associated.

For each choke-point, the burst capacity of that chokepoint is defined as that chokepoints capacity minus the sum of the reserved bit-rates of the presentation devices that are associated with that chokepoint.

Conventional Approach: Statically Provisioned Bandwidth

With conventional scenarios, each downstream presentation device (such as 162a) has a defined amount of statically provisioned bandwidth (e.g., 1 Mbs) between it and the transmission sub-system (such as 152). It never has more bandwidth and it never has less. In conventional scenarios, the presentation device has statically guaranteed bandwidth at all times (whether it needs it or not).

However, there are times, such as when changing channels, where it would be advantageous to receive data at a faster rate; thus, more bandwidth would be desirable. However, in the conventional scenarios, the presentation device will never receive data at a faster rate because its bandwidth is statically provisioned.

Typically, the link between the sub-system and the presentation device is capable of significantly more bandwidth than what is statically provisioned in the conventional scenarios. For example, a typical DSL link is capable of 4 Mbs, but it is often statically provisioned for 1 Mbs or less. Therefore, the full 4 Mbs of each line is not utilized.

The purpose of having a stream obey an overall bit-rate restriction is to be able to guarantee that it's possible to play that stream over a connection that has bit-rate that is always greater than or equal to the stream's bit-rate restriction. The reason a communications channel typically has a fixed bit-rate is either due to technical limitations (it just can't go any faster), or due to the channel being limited to a particular rate so that more money may be charged for higher bit-rates.

The conventional approach is to assume that only bit-rate equal to the bit-rate restriction of the stream will be arriving at the receiver. When deciding when to initiate playback, it is conventionally assumed that only the minimum required bit-rate will be available in the future, and that the stream will require the entire minimum amount continuously in order to not underflow. When sending a stream via unicast to a receiver, it is conventionally assumed that the amount of available bit-rate to the receiver is unknown but presumed greater than the bit-rate restriction of the stream, even in cases where the actual available bit-rate is higher than the bit-rate restriction of the stream.

New Approach: Reserved but Dynamically Allocable Bandwidth

With the exemplary media-stream scheduler, the bandwidth is not statically provisioned. Presentation devices have a reserved bit-rate associated with them. However, that reserved bit-rate may be dynamically given to other presentation devices while scheduling the current timeslot. So, it is not reserved for other presentation devices at a future time.

With the exemplary media-stream scheduler, the maximum burst bandwidth of each presentation device is only limited by inherent limits of the network communication links (including chokepoints along the path). With the exemplary media-stream scheduler, the bandwidth need not be artificially limited to less than its full capabilities.

Several streams may be sent to the same presentation device at the same time. However, the nominal bit-rate of the streams being sent to the presentation device must sum to less than the reserved bit-rate for that presentation device.

Scheduler

The exemplary media-stream scheduler may be implemented (wholly or partially) by the scheduler 130 of the exemplary media-stream network topology 100. As indicated by the arrows in FIG. 1, the media-stream encoders 110 and other content providers 112 provide to the scheduler 130 scheduling information about their outgoing media streams.

The scheduler does not need to receive the actual media stream being sent to the presentation devices (although it may). Rather, it needs to at least know the scheduling information (e.g., the size, PCR, and DTS) of each frame of the streams that are currently being received by the presentation devices. It also knows the scheduling information for newly initiated streams when a presentation device performs a channel change. It also knows the size of each frame and the decode time of each frame.

The exemplary media-stream scheduler distributes the master time base across the media-stream network using some form of network universal clock synchronization, such as Network Time Protocol (NTP). This network time may be synchronized to a universal time keeping system such as Coordinated Universal Time ("UTC Time").

Although the rate of the timestamps on each stream may vary slightly, each stream occasionally includes a timestamp in the time basis of the network universal clock and a corresponding timestamp in the time basis of the stream. That way all network systems and streams are scheduled and synchronized in terms of the network universal clock.

Visibility Window

The scheduler employs a "visibility window." This window allows the scheduler to effectively "look ahead" a designated amount of time in the media streams. Since it cannot actually look ahead, the media streams are delayed by a designated amount of time to simulate a look ahead at the upcoming schedule during that "visibility window." The visibility window is constantly updated so that it maintains a fixed "look ahead" visibility window size.

While the length of the visibility window may be a customizable parameter, the window of ten seconds is used for at least one embodiment described herein. So, references to this 10-second visibility window herein are just one example of the window's length. Of course, other implementations may employ shorter or longer window lengths.

The window is divided into multiple timeslots. The actual length of the timeslots may be a customizable parameter. The length of the timeslot may be, for example, a one-second, half a second, 100 milliseconds, equal to the presentation of one frame, or the expected transmission of one packet.

With at least one implementation described herein, time is divided up into equal-size timeslots. All events that occur during the timeslot can be thought of as occurring at the initial instant of the timeslot.

The Start time of each timeslot is defined in terms of a master time base (the "network universal clock" time base) and streams are grouped according to commonality of timeline. Video and audio streams for the same channel are associated with the same timeline.

It may be the case that some of the streams being sent to a presentation device share the same timeline as one or more other streams being sent to the presentation device. The fact that one stream with a given timeline is being sent does not require all the streams from a given timeline to be sent. The set of streams from a given timeline that are being sent to a presentation device may be called an "outgoing stream set."

Capacity Timelines

Used and unused capacity can be expressed in terms of bit-rate or in terms of data amount. The two ways of expressing used and unused capacity are equivalent, and are used interchangeably in this description.

Every chokepoint in the network has a bit-rate limit. This will be called the chokepoints bandwidth capacity. The reception capabilities of a presentation device are considered part of the network for purposes of configuring chokepoints. If a presentation device can only accept data at a maximum bit-rate that is less than the lowest bit-rate chokepoint between the presentation device and the data sender, then a chokepoint that represents the reception capabilities of the presentation device is used to restrict the sending of data to within the capabilities of the presentation device. The only data that transits the reception-capability chokepoint is data for that presentation device.

For each chokepoint, the scheduler 130 tracks the amount of data allocated to go through that chokepoint for each timeslot and the amount of burst data allocated to go through that chokepoint for each timeslot. The amount of burst data allocated to go through a chokepoint for a timeslot is defined as the sum of the data being sent for each stream to each presentation device that is associated with the chokepoint in the same timeslot that is in excess of the stream's nominal bit-rate.

It tracks this using "capacity timelines." In each timeslot, the unallocated burst capacity of a chokepoint is available to allocate to any stream being sent to any presentation device. When the time of the first timeslot arrives, the unallocated bandwidth (not just the unallocated burst bandwidth) of each chokepoint at the first timeslot is available for sending data from future timeslots to one or more presentation devices.

Using such timelines, the scheduler knows the maximum bandwidth capacity of each chokepoint for each timeslot.

The exemplary media-stream scheduler keeps track of the used bits on a per timeslot basis for each timeslot for each chokepoint. It also tracks for each chokepoint the used burst bits on a per timeslot basis for each timeslot.

With the capacity timelines, the exemplary media-stream scheduler specifies that, for a given outgoing stream to a given presentation device, a given timeslot, and a given chokepoint (or multiple chokepoints), that a timeslot may contain, at maximum, a specified amount of data to send from that outgoing stream at or before that timeslot.

That specified amount is equal to the nominal bit-rate of that stream times the "timeslot width" plus any portion of the most limiting chokepoint's burst capacity that is not used by other streams in that timeslot. The timeslot width is in time units (e.g., seconds, milliseconds, etc.).

The specified maximum amount is determined over all the chokepoints associated with a presentation device, such that the most limiting chokepoint is the one that determines the specified amount. The specified maximum amount is the most data to reserve for sending at or before that timeslot from that outgoing stream to the given presentation device that the scheduler allows the timeslot to contain.

Note that increasing or decreasing the overall burst capacity of a chokepoint by adding or removing associated presentation devices does not alone require any update to the per-chokepoint-per-timeslot used burst bits or per-chokepoint-per-timeslot used bits for each timeslot. An outgoing stream to a presentation device uses burst capacity in a timeslot in an amount defined as the maximum of zero and the bits used in that timeslot by that stream to that presentation device minus the nominal bits-per-timeslot of the media stream. The nominal bits-per-timeslot of the media stream is computed as nominal bit-rate of the media stream times the timeslot width.

The capacity timelines could be shorter than the visibility window. However, as a practical matter (and for the embodiments described herein), the capacity timelines and visibility window are the same size. For example, if the visibility window is ten seconds long and divided into 100 timeslots, then the capacity timelines are also ten seconds long and divided into 100 timeslots.

Deadline Schedule

For each stream that is being sent and for each timeslot, the scheduler 130 tracks the amount of data allocated to that stream in that timeslot and may track the scheduling information (DTS, PCR, frame size) of the specific data allocated to that stream in that timeslot, if any. Data allocated to a stream in a timeslot must go out at or before the time of that timeslot. In other words, the deadline for the data allocated to a timeslot to go out is the time of that timeslot.

The scheduler 130 maintains a schedule that goes several timeslots into the future. The schedule can be thought of as a "deadline schedule." Every outgoing stream in the system has a deadline schedule.

With the deadline schedule, packets slated to go out in a given timeslot must go out by that timeslot. While they may go earlier, they must go out by their designated timeslot. The packets are in that designated timeslot because that is the deadline by which they must go out.

Data for a given stream must always be in stream-order over the timeslots in the schedule. Data may be removed from the schedule as it is sent or discarded, added to the schedule as it is initially scheduled, and moved within the schedule, but later timeslots always hold data later in the stream than earlier timeslots (on a per-outgoing-stream basis). Data may be removed from the middle of the schedule if data is sent from the middle of the schedule, as long as the order of the remaining data is still in stream-order.

Streams are grouped in the deadline schedule according to commonality of timeline. If a video stream and an audio stream are for the same channel, they are associated with the same timeline. The timeline from some content providers (e.g., CNN) may run at a very slightly different actual rate than the timeline for others (e.g., MSNBC). Both may run at a very slightly different actual rate than the master timeline. However, they may be occasionally "pinned" to the master time base with a pair of timestamps, one from the master time base, and one from the timeline provided by the content provider.

In this way, timestamps on a slow or fast (relative to nominal) timeline from a content provider can be converted to and from the master time base by using interpolation where possible and extrapolation where interpolation is not possible. Delay of a content provider timeline relative to it's reception can be achieved by simply shifting the correspondences by the delay amount on the master time base.

The deadline schedule is focused on scheduling when to send packets of media-stream data of the multiple media streams being consumed (or soon to be consumed) by presentation devices.

When the exemplary media-stream scheduler schedules bits into a timeslot, it does so at a certain granularity. This granularity can be partial bits, bits, bytes, equal-size packets, non-equal-size packets, etc. It will be described, herein, as scheduling "bits," but it will be understood that the same description may be applied to scheduling partial bits or any other granularity.

Some implementations may schedule equal-size packets and others may schedule variable-sized packets.

The deadline schedule could be shorter than the visibility window. However, as a practical matter (and for the embodiments described herein), the deadline schedule and visibility window are the same size. For example, if the visibility window is ten seconds long and divided into 100 timeslots, then the deadline schedule is ten seconds long and divided into 100 timeslots.

Operational States of the Exemplary Media-Stream Scheduler

Figure 2:
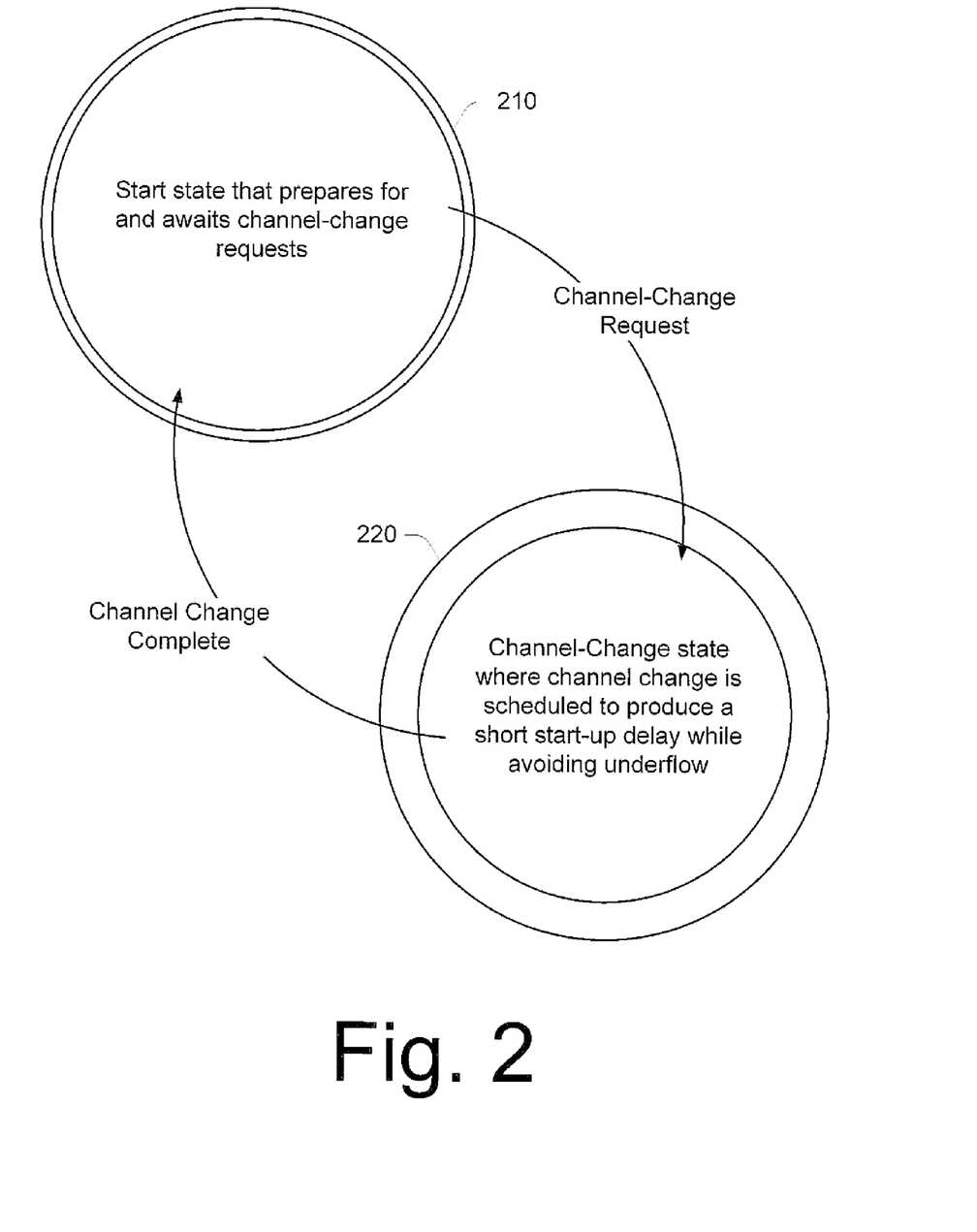
FIG. 2 is a state diagram showing a methodological implementation described herein.

FIG. 2 illustrates a state diagram 200 of an implementation of the exemplary media-stream scheduler on a per stream basis. This implementation is typically performed (wholly or partially) by the scheduler 130 (illustrated in FIG. 1) or equivalent device(s) in a media-stream network topology. Some portion of this implementation may also be performed by the presentation devices. This implementation may be performed in software, hardware, or a combination thereof.

The state diagram 200 of FIG. 2 is based on a per-outgoing-stream-set basis. In other words, the current state of each outgoing stream set may be tracked by its own independent state diagram (like that of FIG. 2). Those of ordinary skill in the art will understand that the discussion herein of the exemplary media-stream scheduler managing the state of a particular outgoing stream set may be applied to it managing the independent state of multiple concurrent outgoing stream sets for multiple presentation devices.

Each outgoing stream set may be Idle 210, Starting 220, or Started 230. The difference between the Idle and Starting states is whether the presentation device has requested the outgoing stream set (represented by the state diagram 200) or not. The difference between Starting and Stalled states is whether the outgoing stream set has actually started being presented yet.

A stream other than the highest priority stream in the outgoing stream set may jump directly from Idle to Started once the highest priority stream has gone from Starting to Started. The jump directly from Idle to Started occurs because the outgoing stream set has already started, and the stream other than the highest priority stream must join this already-started outgoing stream set. Any stream may join an already-started outgoing stream set at any time, and any time such a join occurs, the joining stream jumps directly from Idle to Started. When data is added to the deadline schedule for the joining stream, it is added as late as possible without violating the scheduling restrictions, by starting at the end of the deadline schedule and working backward toward the current timeslot.

In this manner, the earliest deliverable and playable random access point of the joining stream is found, and is subsequently delivered in time to be played. Also, streams may be removed from the outgoing stream set at any time without disrupting the ongoing playback of the other streams in the outgoing stream set. Also, streams may be added to the outgoing stream set at any time without affecting the ongoing playback of the other streams in the outgoing stream set. Although outgoing stream sets in the Starting or Started state may also be in a Paused state, for simplicity sake, the Paused state is not illustrated and not considered here.

Idle state 210 of FIG. 2 represents the idle state condition of the exemplary media-stream scheduler for a particular outgoing stream set. It remains in this condition while it waits for a channel-change request, While it waits, the exemplary media-stream scheduler prepares for such a request. It receives a "visibility window" of scheduling information for each stream being transmitted across a media-stream network, which includes the particular streams that are in the particular outgoing stream set that is the focus of the state diagram 200. With this window, the scheduler knows what packets must be delivered and by what time within the time frame of the window to each presentation device.

The exemplary media-stream scheduler tracks the following "live" information across all timeslots in the window for all streams (including the particular streams of the particular outgoing stream set of the state diagram 200) and for all chokepoints:
   the delivery deadline schedule of the streams being consumed by each presentation device on the network; and
   the dynamic bandwidth utilization timeline of each chokepoint in the network including those chokepoints that correspond to reception bit-rate capabilities of presentation devices (if needed).

It also knows the path of chokepoints that each stream traverses to arrive at each presentation device. Consequently, it can determine the amount of bandwidth that is reserved and that could be reserved for each outgoing stream (going to each device) for each timeslot.

On an on-going basis, it maintains the amount of bandwidth that is reserved and it maintains data that is necessary to quickly determine the bandwidth that could be reserved per stream and per timeslot. The amount of bandwidth that is reserved and that could be reserved is determined by the bandwidth-limited chokepoint(s) that the stream must pass through and the needs of other devices during that deadline schedule. The exemplary media-stream scheduler uses the dynamic bandwidth capacity timelines to maintain and update this data. Specifically, the data maintained and kept up-to-date on a per-timeslot per-outgoing-stream basis consists of the following:
   An indication of what specific data needs to go out for this stream at or before this timeslot, henceforth called the "deadline bit count".
   An indication of how much data is reserved to go out for this stream at or before this timeslot. This amount may be greater than or equal to the amount of specific data indicated. If it is greater, then such reserved data amount must come from a later timeslot, henceforth called the "reserved bit count".
   An implied value (no need to actually store the value since it may be readily and quickly derived from available values) which is equal to the greater of the deadline bit count and the reserved bit count, henceforth called the "effective bit count".
   An implied value which is equal to the effective bit count minus the nominal bit count per timeslot of the stream, henceforth called the "effective burst bit count".

The data maintained and kept up-to-date on a per-timeslot per-chokepoint basis consists of the following:
   The amount of used chokepoint capacity for this chokepoint and this timeslot, henceforth called the "used bit count". The used bit count is the sum of the effective bit count in this timeslot over all streams that transit this chokepoint.
   The amount of used chokepoint burst capacity for this chokepoint and this timeslot, henceforth called the "used burst bit count". This value must be less than or equal to the used bit count value. The used burst bit count is the sum of the effective burst bit count in this timeslot over all streams that transit this chokepoint.

Figure 3:
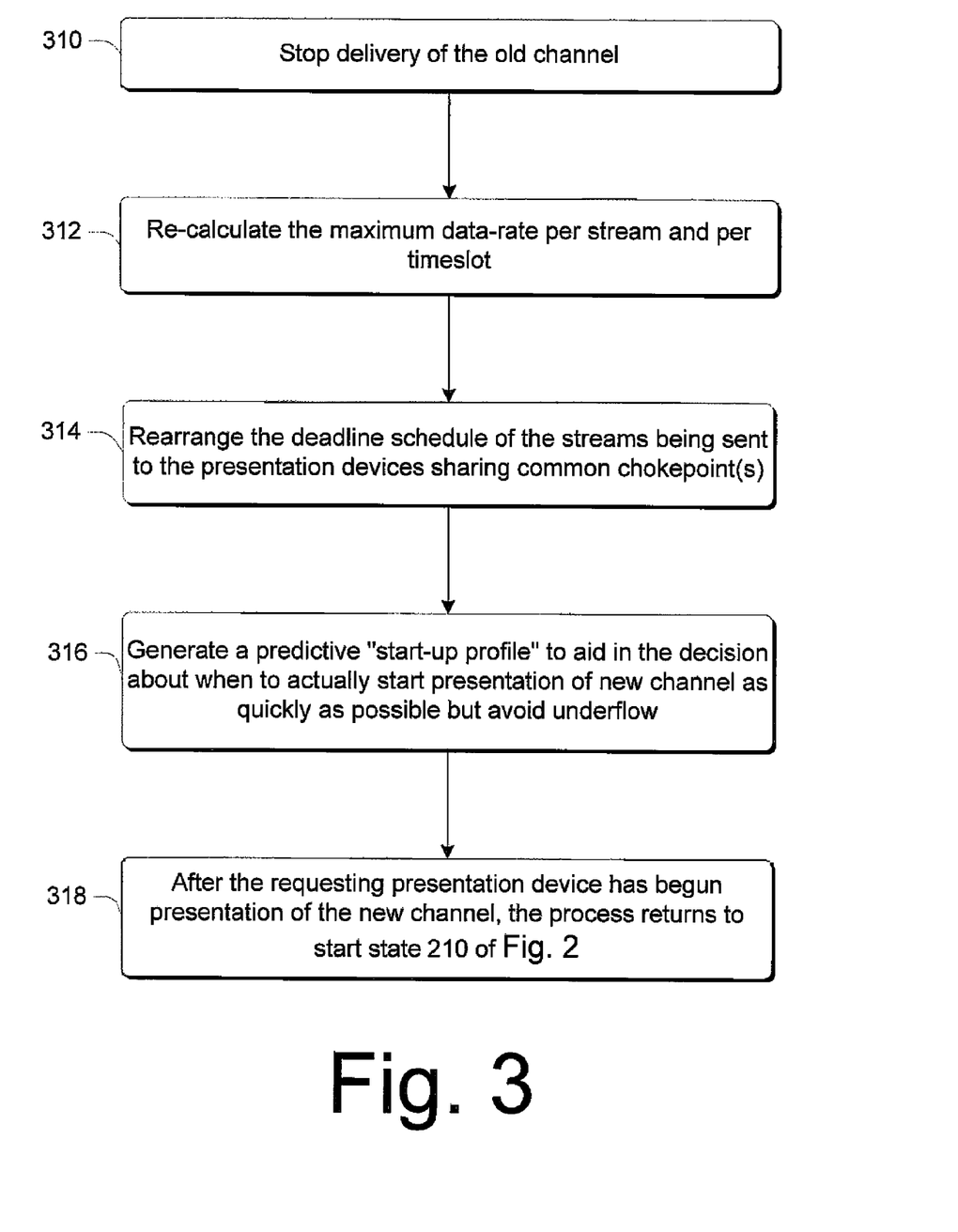
FIG. 3 is a flow diagram showing a methodological implementation described herein.

If the exemplary media-stream scheduler receives a channel-change request for an outgoing stream set (such as the one that is the focus of the state diagram 200), the processing of that particular new outgoing stream set enters the Starting state 220. The actions of the exemplary media-stream scheduler in this state are illustrated in FIG. 3.

In the Starting state 220, the exemplary media-stream scheduler schedules the requested channel change for the particular channel (i.e., the new stream) with a minimum start-up delay while avoiding underflow.

As part of the Starting state for the particular outgoing stream set, it sends a "startup profile" to the receiver (e.g., a presentation device) of the new outgoing stream set. The startup profile specifies how much data the receiver must have in order to be able to start at a particular set of different times. If the receiver starts at a given time with enough data according to the startup profile at that time, then underflow will not occur at a later time. The start-up profile is discussed in more detail later in a section titled "Start-up Profile."

Furthermore, the media-stream scheduler (or other content provider) begins to provide the just-requested media streams of the outgoing stream set (i.e., the "new channel"). For each stream in the outgoing stream set that is sent initially, the first data sent is a frame that is a random access point (RAP). For example, that may be an I-frame in an MPEG stream. This RAP may be shown immediately upon reception and decoding. However, the presentation device will only show full-motion video once it is assured that there will be no underflow because the startup profile is satisfied. This avoids a "hiccup" during startup of the new channel. The media-stream scheduler may initially provide only a sub-set of the streams in the outgoing stream set, or it may initially provide all the streams in the outgoing stream set.

If not all the streams in the outgoing stream set are provided initially, the remaining streams may be provided after the start-up profile is satisfied. When the remaining streams are provided, they are started in the same way that a newly-added stream being added to an already-started outgoing stream set is started. The reason for initially providing less than all of the streams in an outgoing stream set is to make the streams that are initially provided start more quickly than if all the streams in the outgoing stream set were provided initially. For example, video may be provided before audio is provided. Audio may not be provided until after the start-up profile is satisfied.

Started State 230 of FIG. 2 represents the state of the particular outgoing stream set after it has fully stared and it presenting the particular stream. In this state, the presentation device has received enough data to satisfy the startup profile. It presents the channel and notifies the media-stream scheduler (or other content provider) that it is doing so. The presentation device may or may not actually start presenting frames in sequence, depending on whether the presentation is paused or not, but the presentation device is free to begin presenting frames in sequence at any time after the start-up profile is satisfied.

Operation of the Exemplary Media-Stream Scheduler for a Particular Outgoing Stream Set During the Starting State FIG. 3 shows a methodological implementation of the exemplary media-stream scheduler for a particular outgoing stream set during the Starting state 220.

This implementation is typically performed (wholly or partially) by the scheduler 130 (illustrated in FIG. 1) or equivalent device(s) in a media-stream network topology. Some portion of this implementation may also be performed by the presentation devices. This methodological implementation may be performed in software, hardware, or a combination thereof.

The actions illustrated in FIG. 3 and described here are performed on a per-outgoing-stream-set basis. The exemplary media-stream scheduler performs these actions for each new channel in the Starting state 220. The actions of this methodological implementation are predicated upon the exemplary media-stream scheduler having received a channel-change request from a requesting presentation device. The device has requested a new channel.

At 310, the exemplary media-stream scheduler quickly stops delivery to the device of the old channel from the set of streams. The presentation device (and its new channel) can now use the bandwidth formerly allocated to the old channel, in addition to any other bandwidth that the scheduler is able to allocate to the new channel.

When a stream is stopped, the data for that stream is simply removed from the deadline schedule and the chokepoint usage of the chokepoints associated with the presentation device are decreased appropriately.

At 312, the exemplary media-stream scheduler re-calculates the maximum data-rate per stream and per timeslot and it does so taking into consideration the highest priority stream of the new channel, which is the primary stream of new channel requested by the requesting device. The highest priority stream might be the video stream for example, so that the video will start as soon as possible even if it means audio starting slightly later than it would if both the video and the audio were the same priority. The highest priority stream may be a multiplex of a sub-set (up to all) of the streams in the outgoing stream set, the multiplex having the frames from the sub-set ordered according to DTS (decode time stamp) of those frames.

At 314, it inserts the highest priority stream (which itself may be a multiplex of a sub-set of streams from the outgoing stream set) of the new channel into the deadline schedule of the streams being sent to the presentation devices sharing common chokepoint(s). Since the new stream will typically have more data in the beginning of the deadline schedule relative to streams that are already in the deadline schedule, the new stream typically takes precedence over the preexisting streams when the media-stream scheduler is picking data to send earlier than required by that data's location in the deadline schedule.

To preserve causality when working with the deadline schedule, the data that is already is in the deadline schedule may only be moved later into the schedule, never earlier. If this restriction were not enforced, one could have data moving into a timeslot in the past. This deadline would be impossible to meet because it has already passed. Furthermore, the data already in the deadline schedule may be shifted in times, but it is not reordered.

Generally, the scheduler packs data "as late as possible" into the deadline schedule while avoiding underflow of any presentation devices, and never reserving an amount of data which would impinge on the per-client reserved bit-rate of a different client. In other words, the amount of data allocated in a given timeslot to a given stream may never exceed the nominal bit-rate of the stream plus any available burst bit-rate (where available burst bit-rate is burst bit-rate that is not allocated to any other stream).

Herein, "as late as possible" is the temporally last known data being in a timeslot just prior to its PCR timeslot (The PCR timeslot is the timeslot into which the PCR of a packet falls when the PCR (in the stream timebase) is converted into the common timebase on which the timeslots reside, taking into account the common timebase offset of the stream), the timeslot just prior to the PCR timeslot of the temporally last data only containing packets with the same PCR timeslot (to make sure there is room for all future data with the same PCR timeslot), and all temporally prior data must be no later than the timeslot just prior to their DTS timeslot.

This can be efficiently achieved by starting with the temporally latest data that has a PCR timeslot no greater than the last timeslot in the schedule, and, working backward, packing data as late as allowed by the available chokepoint capacities while not violating any of the above constraints. If any of the above constraints would be violated, then the previous timeslot that would not violate the constraint is calculated and the packing continues from there.

Since any ongoing streams are typically being sent ahead of deadline schedule to their devices, a short pause in the reception of the stream will not interfere with uninterrupted presentation of the streams. Of course, the packets of data of these ongoing streams will not be delivered after the timeslot indicated by the deadline schedule, because that would cause an underflow condition.

So, this temporary interruption in the sending of ongoing streams that were being sent early data from the deadline schedule is limited by the need to avoid underflow conditions on the devices with ongoing streams. The interruption in sending of a particular ongoing stream can only last until the first non-empty timeslot for that stream in the deadline schedule. Arrival of that timeslot indicates that the send deadline for that data has arrived, and so it must be sent at or before the arrival of that timeslot.

To minimize the "channel-change start-up delay" while still avoiding underflow, if there is any bit-rate remaining once the data in the current timeslot of the deadline schedule has been slated to go out in the current timeslot, additional data is slated to go out in the current timeslot above and beyond just the data that must go out by the current timeslot.

This additional bit-rate may be allocated entirely to streams which have not started playback yet, providing those streams the "maximum allowable data rate" given the chokepoints data must pass through in order to reach the destination client. Since the additional bit-rate was never reserved for the stream, it does not have to stay within the restriction that it never exceed the nominal rate of the stream plus the unused portion of the burst bit-rate.

The additional bit-rate may be all the remaining available bit-rate through the relevant chokepoints. This greatly reduces the start-up delay to the order of 100 ms (rather than the conventional 1-2 seconds), because the receiver can begin playback of the stream the moment the receiver has satisfied the startup profile, and the startup profile is satisfied more quickly when the stream is given this extra bit-rate in the current timeslot.

Note that since this extra bit-rate is not reserved, any other receiver that requests a channel change will still have available at least the per-client reserved bit rate at the very next timeslot and all subsequent timeslots. Any unused portion of the burst bit-rate can also be reserved by the other receiver, but there may not be any unused portion of the burst bit-rate.

While presentation devices have a reserved bit-rate associated with them, their reserved bit-rate may be given to other presentation devices while scheduling the current timeslot.

At 316, the exemplary media-stream scheduler generates a predictive "start-up profile" to aid in the decision as to when to actually start presentation of a new channel as quickly as possible while avoiding underflow. The start-up profile is discussed in more detail later in a section titled "Start-up Profile."

Generally, the start-up profile takes into account how much extra data beyond the reserved data would be required during one or more ranges in time in order for the stream to be able to start presenting during that time range and be guaranteed not to underflow at a later time even if the stream only receives its reserved data (reserved bit-rate, "reserved bit count" in subsequent timeslots) going forward after the presentation of the stream has begun.

The conventional approaches use one or more designated time stamps (such as a PCR and DTS) to indicate when a presentation device should begin presentation while avoiding underflow. Unlike that, the exemplary media-stream scheduler produces a start-up profile, whereas the trigger to begin presentation is based upon actual knowledge of the network chokepoints, the utilization of those network chokepoints over time, and the actual stream schedule.

The start-presentation trigger in the start-up profile can be based on the conditions of the current timeslot. The start-up specifies the number of bits (or it could be packets or some other units) that a presentation device must have received by each timeslot. If it has received the number of bits designated in the current timeslot (or more), then it may begin presenting the stream without fear of underflowing at a later time.

The exemplary media-stream scheduler sends the start-up profile to the requesting presentation device. The requesting device checks to see what the present timeslot is and then it checks to see how many packets of the highest-priority stream of the new channel that it has received. If the number of packets received meets or exceeds the number specified for the current timeslot in the start-up profile, the presentation device may start presenting the new stream (and be guaranteed that there will be no underflow). In other words, if the number of actually received packets is greater than or equal to the profile number (for the current timeslot), then it may begin presenting the incoming stream. If the presentation device is paused, it may not actually start presenting the incoming stream immediately, but once the start-up profile is achieved, the presentation device is free to start presenting at any subsequent time.

Instead of sending the start-up profile to a device, the exemplary media-stream scheduler may, alternatively, analyze the start-up profile itself and send a message to the presentation device as to when it should (or could) start playing the new channel.

After the requesting presentation device has begun presentation of the new channel, it may be configured to inform one or more units on the network exactly when it started playing a frame. The units notified may include the content distribution system, the scheduler, and/or the media-stream encoder.

When it is determined that the presentation device has started playing the first frame, either by the presentation device reporting that it started playing the first frame, or by the exemplary media-stream scheduler determining that enough extra data has been sent to satisfy the start-up profile, the channel start-up is complete. That particular channel may be considered to be in the Started State 230.

Furthermore, the exemplary media-stream scheduler may determine the stream's timeline offset. The stream timeline offset may be most effectively expressed as a time delta in units of the common timebase.

Stated another way, the exemplary media-stream scheduler receives a request to start a new media stream from a media-stream presentation device on a media-stream network having one or more bandwidth-limiting chokepoints therein.

It then calculates an available data-rate reservation on a time-dependent basis through the network to the presentation device, wherein the available data-rate is limited by the one or more chokepoints in the network and their already-reserved time-dependent data-rate usage;

After that, the exemplary media-stream scheduler inserts delivery deadlines of data of the new media stream into a delivery deadline schedule of outgoing media streams being sent via the network, wherein data scheduled proximate to a start of the new stream is scheduled to be delivered via the network to the presentation device at a data-rate equal to or greater than the calculated available data-rate, wherein the delivery deadline schedule determines a minimum bit-rate and a deadline by which data from the outgoing media streams will be delivered via the network.

The exemplary media-stream scheduler does bit-rate-based scheduling, until it gets caught up to the extent that it can guarantee no underflow due to subsequent frames given a start time of now, and at that point the exemplary media-stream scheduler switches to scheduling by deadline instead of bit-rate.

Proximate to a Start

The scheduler allocates bit-rate proximate to the current time (and current timeslot) so that data will be delivered at or above an allocated bit-rate per timeslot.

The scheduler allocates data delivery deadlines further out from the current time so that data will be delivered by the allocated time.

The dividing line between the two forms of allocation is placed so that even if the presentation device starts playing data at the current timeslot, when the dividing line is reached, there is no danger of underflow even if the presentation device has received only the allocated bit-rate, and no more, given that it will continue to be sent data according to the allocated deadlines after the dividing line.

Note that the "current timeslot" does not move for purposes of the above explanation—the described scheduling all happens very quickly at the "current time" and "current timeslot".

Start-Up Profile

When a channel change is requested, the exemplary media-stream scheduler schedules the highest priority stream for a new timeline. This highest priority stream may actually be a multiplex ("mux") of normally separate streams. For each timeslot, starting at the first timeslot, the number of bits that can be reserved for the starting output stream is determined.

For a given timeslot, this is determined as the minimum over all the chokepoints associated with the presentation device of the quantity nominal bits-per-timeslot for this output stream, plus available unused burst bits of the chokepoint. Now, for each timeslot, the number of bits the exemplary media-stream scheduler can guarantee to this output stream in that timeslot is known.

Although every timeslot has a guaranteed number of bits going to the presentation device, the presentation device may be sent more bits than that. However, at any moment, the number of bits-per-timeslot being sent to the presentation device may drop back to just the reserved number of bits-per-timeslot.

For each timeslot, the exemplary media-stream scheduler calculates how many "extra" bits are required at that timeslot in order for the presentation device to be able to start at that timeslot and be guaranteed of not underflowing at a later time.

The "start-up profile" is this calculation of the "extra" bits required for each timeslot for the presentation device to start presentation and be guaranteed of not underflowing, plus the guaranteed bits for each timeslot. In other words, the "start-up profile" is a per-timeslot total number of bits required in that timeslot for the presentation device to start presentation and be guaranteed of not underflowing.

Since the number of extra bits required at a given timeslot does not change as extra bits are given to the presentation device in a prior timeslot and the number of reserved bits at a given timeslot does not change as extra bits are given to the presentation device in a prior timeslot, the exemplary media-stream scheduler may calculate the required number of total required bits on a per-timeslot basis up front, during the initial start of the stream, so that later the presentation device (or the exemplary media-stream scheduler itself) can determine that start-up at a particular time is safe.

The required number of "extra" bits-per-timeslot can be represented directly, or it can be included in the required number of total bits.

The start-up profile is not necessarily strictly increasing and is not necessarily strictly decreasing over time when viewed in terms of the total required number of bits in each timeslot. That is the reason for a start-up profile instead of just a fixed start-up number or some other less-exact representation. The more accurate the representation of the start-up profile, the sooner the receiver can satisfy the delivered representation of the start-up profile.

The start-up profile does not specify an actual start time of each timeslot in the profile. That can be inferred from the start time of the profile and the "timeslot width."

Network Latency And Jitter

To take network latency and jitter into account, the start-up profile may be modified to add an additional factor (e.g., "min_latency") to the start time of the start-up profile. For each timeslot of the start-up profile, the "extra" amount relative to the guaranteed amount is determined, then that extra amount is added to the guaranteed amount at the timeslot that is max_latency−min_latency in the future, relative to the timeslot that is currently being modified, and that value replaces what is in the start-up profile for the timeslot that is currently being modified.

In this manner, the exemplary media-stream scheduler insures that, even if the just-received data transited the network in min_latency, there is a guarantee that there will be enough extra data such that if all remaining data comes in having transited for max_latency, there will still be enough data to not underflow.

Another way of achieving this would be to stamp some or all the data with some form of absolute or relative timestamp indicating exactly when it was sent so that latency on that packet could be explicitly determined. If that was done, then the presentation device could directly insure that it satisfies the start-up profile even assuming that all subsequent data arrives having transited for max_latency.

Output Stream Start-Up with Already-Running Timeline

If the timeline on which the new stream will play is already running, all streams, both new and ongoing, should conform to the already-running timeline. For example, switching from one spoken language audio stream to another (e.g., from English to Spanish) will not cause any interruption in the video, and the new audio track (e.g., Spanish) should already be synced properly when it starts and should remain synced and hiccup-free.

In this instance, the exemplary media-stream scheduler will adhere to the existing timeline for the new stream joining an ongoing timeline, but, as for all streams, it will schedule the new stream as late as possible in the deadline schedule. Scheduling the new stream as late as possible in the deadline schedule has the added benefit for new streams of fitting as much of the earlier portion of the new stream into the schedule as possible. Data of the new stream that is earlier than the earliest data of the new stream that fits in the deadline schedule will not be sent, and therefore cannot be presented by the presentation device. In this manner, the exemplary media-stream scheduler achieves shorter stream-join-in time than conventional approaches.

Putting the data for the new stream as late as possible in the deadline schedule does not mean that it will be sent later than other ongoing streams. The opposite is typically the case because the new stream is typically (but not always) the stream with the earliest data present in the deadline schedule, and so will typically be used preferentially when early data is needed for the current timeslot.

When scheduling the new stream into an already-running timeline, the scheduler insures that the last data for the new stream that is put in the schedule is put in the slot just prior to that data's PCR timeslot, and that the slot just prior to the PCR timeslot contains only data that has the same PCR timeslot, that all prior data is placed such that it fits within the bit-rate that can be reserved for the stream on a per-timeslot basis, and that all prior data is at or prior to the timeslot prior to the data's DTS timeslot. The data of the new streams (and the other scheduled streams) need not be placed into the deadline schedule by working in media-stream order or reverse media-stream order within the deadline schedule and media stream, but doing so makes it easier to enforce all the above restrictions and is typically done. Regardless, it is required that the data of all streams in the deadline schedule be in media-stream order in the deadline schedule, whether or not they were placed there by working on the media stream in media-stream order, reverse-media-stream order, or arbitrary order.

Other Implementation Notes

The exemplary media-stream scheduler chooses additional data to fill the chokepoints when scheduling for the current timeslot. It chooses streams that have not yet satisfied their startup profile first, followed by streams that have.

Within each group, the exemplary media-stream scheduler chooses the stream with first data that has the earliest deadline over streams with first data that has later deadlines. Retries have higher priority than any other additional data.

The total amount of burst bit-rate for a chokepoint is the total bit-rate of that chokepoint minus the per-client reserved bit-rates of all the presentation devices whose downstream data must transit that chokepoint, whereas the amount of used burst bit-rate is the sum over all such presentation devices of the amounts used for streams being delivered to those presentation devices in excess of the nominal bit-rate of those streams. This is so there will be room for another stream to that presentation devices in all chokepoints and all timeslots (no need to steal from the total amount of burst bit-rate), as long as the nominal rate of that additional stream fits within the per-client reserved bit-rate minus the nominal bit-rates of all the already-present streams to that client.

Computing Environment

The one or more embodiments, as described herein, may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set-top boxes, programmable consumer electronics, network PCs, minicomputers, mainframe computers, distributed computing environments that include any of the above systems or devices, and the like, The one or more implementations, as described herein, may also be practiced in distributed computing environments where tasks are performed by remote processing devices that are linked through a communications network. In a distributed computing environment, program modules may be located in both local and remote computer storage media including memory storage devices.

The one or more implementations, as described herein, may be described in the general context of processor-executable instructions, such as program modules, being executed by a processor or a computer. Generally, program modules include routines, programs, objects, components, data structures, etc. that perform particular tasks or implement particular abstract data types and functions. Typically, the functionality of the program modules may be combined or distributed as desired in various embodiments.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable memory having processor-executable instructions that, when executed by a processor, perform a method comprising:

receiving a request to start a new media stream from a media-stream presentation device on a media-stream network having one or more bandwidth-limiting chokepoints therein; and generating a start-up profile based on chokepoint bandwidth data that indicates the conditions under which a presentation device can start presenting the new media stream without underflowing, wherein the conditions provide a temporally based test for a succession of timeslots of whether the device has received enough data at each timeslot to avoid underflow if it begins playback at the timeslot.

2. A memory as recited in claim 1, wherein the method further comprises sending the start-up profile to the presentation device so that the device can perform the temporally based test.

3. A memory as recited in claim 1, wherein the method further comprises sending a start-presentation notification to the presentation device when the temporally based test indicates that it may start presentation of the new media stream.

4. A memory as recited in claim 1, wherein the method further comprises:

modifying the start-up profile by adding a minimum latency factor to a start time of the start-up profile.

5. A computer-readable memory having processor-executable instructions that, when executed by a processor, perform a method comprising:

sending a request to start a new media stream from a media-stream presentation device on a media-stream network having one or more bandwidth-limiting chokepoints therein; and receiving a start-up profile that is based on chokepoint bandwidth data that indicates the conditions under which the presentation device can start presenting the new media stream without underflowing, wherein the conditions provide a temporally based test for a succession of timeslots of whether the presentation device has received enough data at each timeslot to avoid underflow if it begins playback at the timeslot.

6. A memory as recited in claim 5, wherein the method further comprises:

delaying presentation of the new media stream when the presentation device has not received enough data at each timeslot to avoid underflow to begin playback at the timeslot.

7. A media-stream presenter comprising:

a processor;

a transmission sub-system configured to send a request to start a new media stream on the presenter, wherein the request is sent via a media-stream network having one or more bandwidth-limiting chokepoints therein; and a receiving unit configured to receive a start-up profile and use the processor to read chokepoint bandwidth data in the start-up profile that indicates the conditions under which the media-stream presenter should start presenting the new media stream, wherein the conditions provide a temporally based test for a succession of timeslots of whether the media-stream presenter has received enough data at each timeslot to avoid underflow if it begins playback at the timeslot.

8. A media-stream presenter as recited in claim 7, the receiving unit further configured to:

delay presenting the new media stream when the media-stream presenter has not received enough data at each timeslot to avoid underflow to begin playback at the timeslot.

* * * * *